United States Patent [19]

Ishihara et al.

[11] 4,273,008
[45] Jun. 16, 1981

[54] AUTOMATIC TRANSMISSION

[75] Inventors: Takeo Ishihara, Asaka; Tsutomu Hayashi, Hoya; Masumi Hamane, Kawagoe, all of Japan

[73] Assignee: Honda Giken Kogyo Kabushiki Kaisha, Tokyo, Japan

[21] Appl. No.: 53,325

[22] Filed: Jun. 29, 1979

[30] Foreign Application Priority Data

Jul. 4, 1978 [JP] Japan ................................ 53-81152

[51] Int. Cl.³ ...................... F16H 3/74; F16H 3/44; F02N 5/02
[52] U.S. Cl. ............................. 74/752 E; 74/781 R; 123/179 S; 185/39
[58] Field of Search ............... 74/752 E, 752 R, 751, 74/781 R, 766, 767; 185/39; 123/179 S

[56] References Cited

U.S. PATENT DOCUMENTS

| 2,189,220 | 2/1940 | Osborne | 74/752 E |
| 2,593,804 | 4/1952 | Schott | 74/752 E X |
| 2,649,817 | 8/1953 | La Voque | 74/752 E X |
| 2,682,788 | 7/1954 | Dalrymple | 74/752 E |
| 2,694,479 | 11/1954 | Rainsford | 74/752 E X |
| 3,939,734 | 2/1976 | Blanchette et al. | 74/752 E |
| 4,067,243 | 1/1978 | Kurata et al. | 185/39 X |
| 4,091,887 | 5/1978 | Kurata et al. | 123/179 S X |
| 4,176,648 | 12/1979 | Gotoh et al. | 123/179 S |

Primary Examiner—Allan D. Herrmann
Attorney, Agent, or Firm—Irving M. Weiner; Pamela S. Burt; John L. Shortley

[57] ABSTRACT

An automatic transmission including a drive shaft directly connected to a drive source, an output shaft, and a planetary gear mechanism provided between the drive shaft and output shaft and serving to effect automatic speed change in power transmission. The planetary gear mechanism is mounted on the drive shaft with its sun gear fitted thereon. Thus, the length dimension of the drive shaft can be reduced to provide a very compact system. Further, a plurality of clutches are arranged in a radial plane between the drive shaft and the output shaft, thus permitting a further reduction in the size of the system.

14 Claims, 5 Drawing Figures

AUTOMATIC TRANSMISSION

BACKGROUND OF THE INVENTION

The present invention relates to a system for automatically effecting speed change in power transmission from an internal combustion engine or the like. By utilizing the gear ratio change action of a planetary gear mechanism.

More specifically, the invention relates to an automatic transmission in which a planetary gear mechanism is mounted on a drive shaft to permit reduction of the length dimension of the drive shaft, mainly for the purpose of making the entire system more compact.

In general, a motorcycle has a body which is considerably small compared to a common passenger car or other such vehicle, and the space required for assembling necessary parts and devices is limited. Particularly, in small motorcycles such as "mopeds" which are designed to have a reduced weight and size and a simplified driving operation, the smaller the size of the motorcycle, the smaller the space available for assembling necessary parts and devices. In order to cope with the limitation upon available space, it is necessary to make the apparatus to be accommodated in such a space more compact. Further, this requirement may be applied not only to motorcycles, but also to common vehicles and other machines and apparatuses wherein a compact arrangement of a number of parts and devices is necessary to avoid excessive space consumption.

In the aforementioned small motorcycles or similar vehicles, it is necessary to provide a construction which permits ready driving operation even by one who is not skilled in driving techniques, in addition to minimizing the number of parts so as to simplify construction. Because a construction in which a gear ratio change is effected by a pedalling operation requires much skill for expert handling, it is desirable to employ an automatic transmission in which the gear ratio of an output shaft for rotating the drive wheel is automatically changed with the increase of the engine rpm. The automatic transmission usually has an assembly including a number of parts such as clutch means, and with an increase of the number of component parts, the space for assembling the parts is correspondingly increased, leading to a size increase for the entire system. For example, in an automatic transmission which comprises a centrifugal clutch mounted on a drive shaft, a plurality of first gears coupled to inner and outer members of the clutch, and a plurality of second gears provided on a counter shaft which are different in diameter from the first gears, the first gears are naturally spaced apart from each other in the axial direction because they must be coupled to the inner and outer members of the clutch, and the second gears in mesh with the first gears are also axially spaced apart from each other. Therefore, the length dimension of the shafts is increased. In addition, the counter shaft for taking out the transmitted power has to be provided in parallel with the drive shaft, which inevitably causes a further increase in the size of the system. Increased size of the system, however, must be avoided, which results in one of the problems associated with the design of the automatic transmission. A compact automatic transmission is useful not only for motorcycles but also for other machines and apparatuses, i.e., it can also be employed for systems other than motorcycles.

In view of the foregoing problems, the present invention provides a transmission system extending from a drive shaft to an output shaft as an automatic transmission, such automatic transmission being compact so as to be readily mounted even on a very small motorcycle.

SUMMARY OF THE INVENTION

An object of the invention is to provide an automatic transmission which comprises a drive shaft driven from a drive source, a centrifugal clutch, a planetary gear mechanism and an output shaft from which power from the drive shaft is taken out through the planetary gear mechanism. The drive shaft is of the cantilever-support type with a proximal end of the drive shaft being supported by a bearing near the drive source. The planetary gear mechanism includes an outermost ring gear, a central sun gear, and planet gears provided between and meshing with the ring and sun gears. The drive shaft is coupled to one of the three different types of gears of the planetary gear mechanism through the centrifugal clutch. The output shaft is coupled to another one of the three different types of gears. The planetary gear mechanism is mounted on the drive shaft with the sun gear at the center of the planetary gear mechanism being fitted on the drive shaft, and the centrifugal clutch and planetary gear mechanism are disposed so as to face each other.

With such construction according to the invention, the three different types of gears of the planetary gear mechanism are not spaced apart from each other in the axial direction but are arranged in the radial direction, so that it is thus possible to reduce the length dimension of the drive shaft and make the system compact. In addition, the output shaft from which the transmitted power is taken out may be arranged coaxially with the drive shaft, thus permitting further size reduction of the system.

Another object of the invention is to provide an automatic transmission in which a one-way clutch is coupled to either one of the ring gear, planet gears and sun gear of the planetary gear mechanism which is coupled to neither the drive shaft nor the output shaft. The one-way clutch is secured to a stationary member such as a crank case and disposed at a position on the opposite side to the drive source for the drive shaft with respect to a power take-out member, such as a sprocket wheel secured to the output shaft.

If the drive source comprises an internal combustion engine and the drive shaft comprises a crankshaft, the crankshaft is supported at a position near the internal combustion engine by a bearing. Because in this case the driving wheel of a motorcycle, for example, is rotated by the output from the power take-out member secured to the output shaft, bending forces are applied to the crankshaft through the power take-out member and to the output shaft. With the provision of the one-way clutch at a position spaced apart further from the internal combustion engine than from the power take-out member, a role similar to that of a bearing provided on the side opposite to the above-mentioned bearing with respect to the power take-out member is played by the one-way clutch because it is coupled to both the stationary member and also to the planetary gear mechanism mounted on the drive shaft. In this manner, the power take-out member is supported on both sides by members acting as bearings, so that flexing of the crankshaft due to bending forces acting thereupon can be prevented. In other words, because the one-way clutch also serves as a bearing, there is no need to provide a separate bearing at the free end of the crankshaft, and a cantilever support with only a single bearing suffices.

Yet another object of the invention is to provide an automatic transmission in which the drive shaft and ring gear of the planetary gear mechanism are coupled together via a first clutch of the centrifugal type, the output shaft is coupled to the planet gears, and the one-way clutch is coupled to the sun gear. With such construction, when the engine rpm reaches a predetermined value, the first clutch is coupled to cause rotation of the ring gear in unison with the drive shaft. As a result, the planet gears meshing with the ring gear and also with the sun gear, the rotation of which is prevented by the one-way clutch, are caused to revolve over the sun gear at a lower speed of revolution than the ring gear while also rotating themselves, and this revolution is taken out by the output shaft, which is thus rotated at a reduced speed with respect to the drive shaft. Further, the planet gears are supported by a carrier, through which the planet gears and output shaft are coupled together. A second clutch of the centrifugal type is provided between the drive shaft and carrier. In this manner, the second clutch is coupled with an increase of speed of revolution of the planet gears with increasing engine rpm. With the coupling of the second clutch, the drive shaft and output shaft are directly coupled to each other with the one-way clutch de-coupled. Thus, the drive shaft and output shaft are rotated at the same speed in the accelerating state.

A further object of the invention is to provide an automatic transmission in which the planetary gear mechanism and second clutch are arranged to oppose each other in the axial direction such that a projection of an inner member of the second clutch, projecting in the axial direction, is disposed at least partially in the space defined by the afore-mentioned three different types of gears comprising the planetary gear mechanism. With such arrangement of the projection of the inner member of the second clutch which is provided for obtaining necessary centrifugal forces, the clutch and planetary gear mechanism partially overlap each other in the axial direction, which further promotes a compact design of the entire transmission system.

Another object of the invention is to provide an automatic transmission in which the second clutch is assembled in the inner space in the first clutch. With such construction, two clutches can be accommodated in a space for a single clutch. In other words, two clutches can be used without requiring an extra shaft length dimension, which further promotes the compact design of the entire system.

Yet another object of the invention is to provide an automatic transmission in which the sun gear of the planetary gear mechanism is fitted on an output shaft sleeve rotatably fitted on the drive shaft. With such construction, in the state of the reduced speed of rotation of the output shaft sleeve before its direct coupling to the drive shaft, the drive shaft rotating at a high rotational speed, the output shaft sleeve rotating at a reduced speed and the sun gear in the stationary state are disposed in order in the radial direction, so that it is possible to reduce wear of and frictional resistance offered to the frictional surfaces of these parts.

The above and other objects, features and advantages of the present invention will become apparent from the following detailed description of preferred embodiments of the invention, with reference being had to the accompanying drawings.

DETAILED DESCRIPTION

Figure 1:
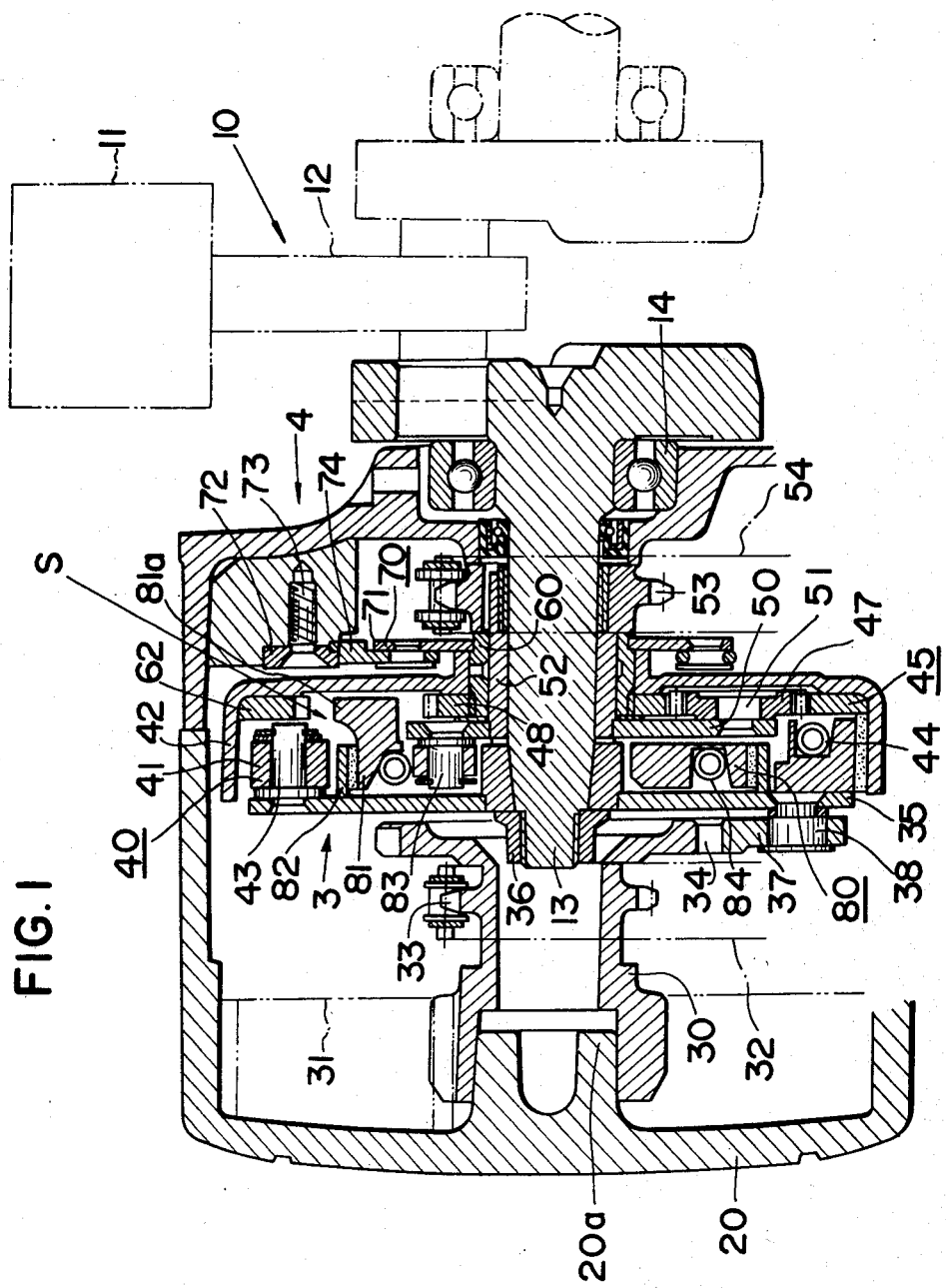
FIG. 1 is an axial sectional view showing the entire automatic transmission embodying the invention.

The present embodiment of the automatic transmission according to the invention is applied to a small-sized light motorcycle. A crankshaft 13 of an internal combustion engine 10 including a piston 11 and a connecting rod 12, is journalled in a bearing 14 at its proximal end on the side of the internal combustion engine 10. Crankshaft 13, which serves as a drive shaft, extends into the interior of a crank case 20 accommodating the automatic transmission, and has a cantilever structure with only the proximal end thereof supported by bearing 14. Because no other bearing is provided at the free end thereof, the length of drive shaft 13 can be correspondingly reduced. A starter shaft 30 is provided within case 20 and is supported by a shaft support 20a. Starter shaft 30 is coaxial with drive shaft 13, and the free end thereof faces the free end of drive shaft 13. A spiral spring 31 is disposed on the outer periphery of the proximal end of starter shaft 30, with one end thereof attached to starter shaft 30 and the other end thereof attached to the inner surface of case 20. The starter shaft 30 has an integral sprocket wheel 33, to which is coupled a chain 32 which extends to a foot pedal of the motorcycle. By operating the foot pedal, the sprocket wheel 33 and starter shaft 30 are rotated to wind spiral spring 31 and store a spring force for starting the internal combustion engine.

The end of starter shaft 30 facing drive shaft 13 is increased in diameter, and the outer periphery thereof is provided with ratchet teeth 34. The free end of drive shaft 13, on the other hand, is provided with an integral drive plate 35 extending radially outwardly at right angles to drive shaft 13 and retained thereon by a nut 36. A pawl 37 is pivoted by a pin 38 to a peripheral edge portion of drive plate 35. When pawl 37 meshes with one of the teeth 34 and the spring force stored in spiral spring 31 is released, starter shaft 30 is rotated. This torque is transmitted through ratchet teeth 34 and pawl 37 to drive plate 35 so as to cause rotation of drive shaft 13 integral with drive plate 35 for starting the internal combustion engine 10. After the engine has been started, drive shaft 13 is thereby rotated at a high speed, so that pawl 37 is caused to move pivotally about pin 38 by centrifugal forces and is thus released from meshing engagement with ratchet teeth 34 to ensure the driving of drive shaft 13.

While in the present embodiment the starting system for the internal combustion engine is of the type using a foot pedal, starter shaft 30 and spiral spring 31 for manually storing and releasing the spring force, the automatic transmission according to the invention (which is described hereinbelow) is also applicable to kick starters or starters using starter motors as generally employed for motorcycles.

A first clutch 40 of the centrifugal type serves as a starter clutch, and the inner members 41 thereof are pivoted by respective pins 43 to peripheral edge portions of drive plate 35. Normally, the inner members 41 are spring-biased radially inwardly by associated springs 44, respectively. The starter clutch 40 has a drum-like outer member 42 closed on the side thereof closest to engine 10, and coaxially fitted for rotation on the outer periphery of drive shaft 13. The mouth of drum-like outer member 42 on the opposite side is closed by drive plate 35 to define an enclosed inner space, which is available for accommodating various other parts and mechanisms. More specifically, a planetary gear mechanism 45 is assembled in the inner space defined by drum-like outer member 42 such that it is in close contact with the inner side of outer member 42. The planetary gear mechanism 45 comprises three different types of gears arranged in the radial direction, i.e., an outermost ring gear 46 having an internal gear, a central sun gear 48, and three planet gears 47 provided between ring gear 46 and sun gear 48. As clearly shown in FIG. 3, the three planet gears 47 are uniformly spaced in the circumferential direction in the space between sun gear 48 and ring gear 46, and in mesh with both gears 46 and 48. The planetary gear mechanism 45 is coaxially mounted on drive shaft 13 with a central through hole 48a of sun gear 48 fitted on drive shaft 13. The outermost ring gear 46 of planetary gear mechanism 45 is secured to the inner peripheral surface of the drum-like outer member 42 of starter clutch 40, so that ring gear 46 is coupled, through clutch 40 and drive plate 35, to drive shaft 13. The three planet gears 47 are each rotatably mounted on a pin 51 provided on a plate-like carrier 50, the center of which is secured to an end of an output shaft 52, so that planet gears 47 are coupled to output shaft 52 through carrier 50. The output shaft 52 is in the form of a sleeve coaxially fitted for rotation on the outer periphery of drive shaft 13. Output shaft 52 extends from the end thereof coupled to carrier 50 toward the engine 10, and has a power take-out member 53 integrally mounted thereon adjacent to the end thereof closest to engine 10. In the present embodiment, power take-out member 53 comprises a sprocket wheel coupled by a chain 54 to the driving wheel of the motorcycle, so that the driving wheel is rotated by power from output shaft 53.

The radially central sun gear 48 of the planetary gear mechanism is coupled to an end of a sleeve member 60 rotatably fitted on the outer periphery of output shaft 52, thus providing a triple shaft structure consisting of drive shaft 13, output shaft sleeve 52, and sleeve member 60 radially arranged in the mentioned order. Sleeve 60 extends from the end thereof coupled to sun gear 48 toward the engine 10, and has a length shorter than the length of output shaft sleeve 52. Sleeve 60 is provided at the end thereof closest to engine 10 with a one-way clutch 70. The one-way clutch 70 is thus located at a position spaced apart further from engine 10 than sprocket wheel 53 coupled to output shaft 52, i.e., it is provided on the side opposite to bearing 14 with respect to sprocket wheel 53 constituting the power take-out member.

Figure 4:
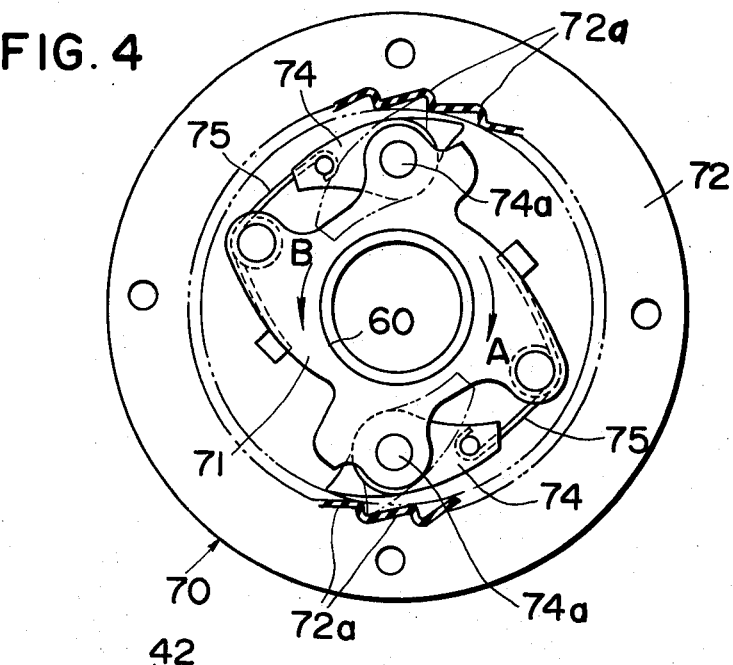
FIG. 4 is a back elevational view taken in the direction of arrow 4 in FIG. 1, showing a one-way clutch.
Figure 5:
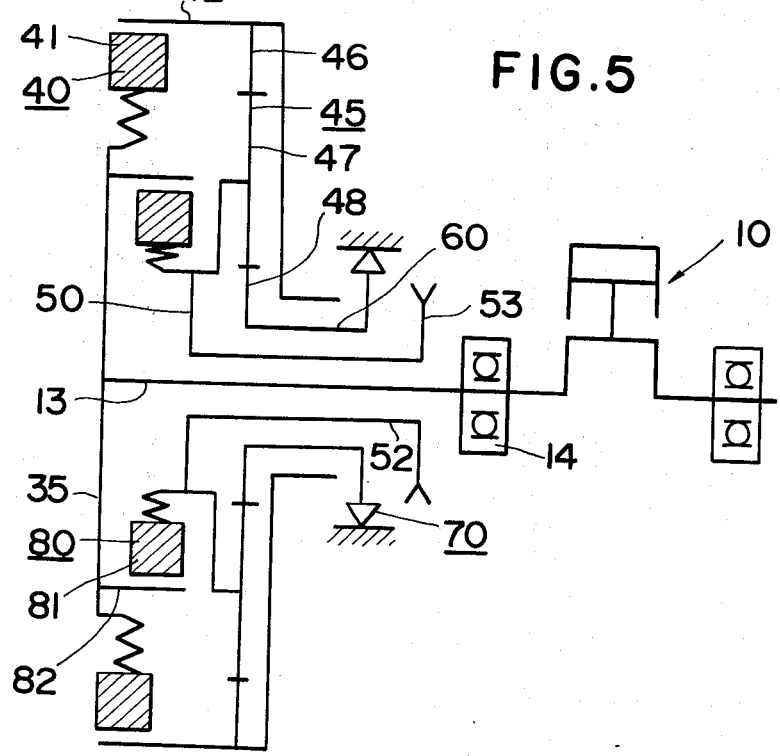
FIG. 5 is a schematic representation of the power transmission system in the automatic transmission according to the invention.

As shown in FIG. 4, one-way clutch 70 includes a central clutch plate 71 which is coupled to the end of sleeve 60 as described above. Clutch plate 71 is assembled within a ring-like ratchet plate 72, which is provided on its inner periphery with teeth 72a slanted in one direction and covered with an elastic material such as rubber. As shown in FIG. 1, ratchet plate 72 is secured by bolts 73 to case 20, which is a stationary member. Clutch plate 71 has two pawls 74 each pivoted by a pin 74a thereto and biased by a spring 75 such that when a force tending to rotate it is applied in the direction of arrow A, the pawls 74 are engaged with teeth 72a of ratchet plate 72. If the force is applied in the direction of arrow B, the engagement between pawls 74 and teeth 72a is released to permit rotation.

Figure 2:
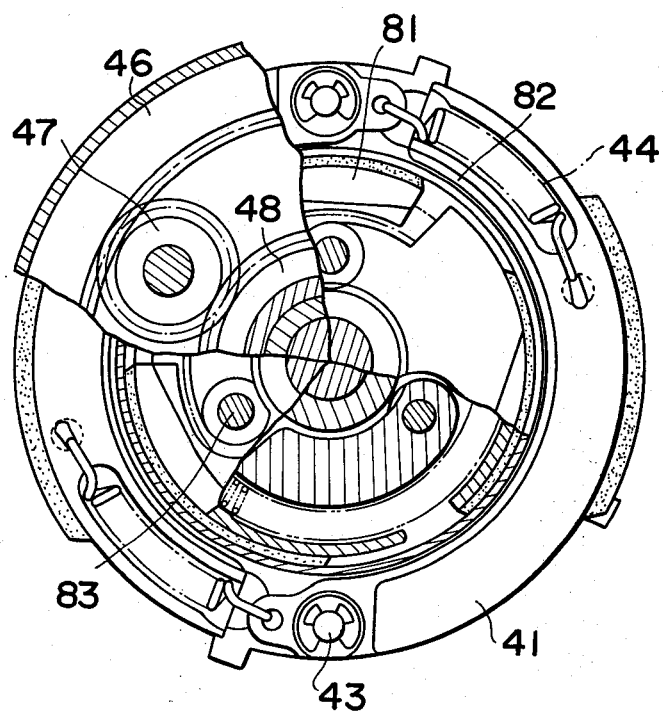
FIG. 2 is a view partly broken away in the axial direction, showing a centrifugal clutch and a planetary gear mechanism.

As shown in FIG. 1, a second clutch 80 of the centrifugal type serves as a change-gear clutch. Second clutch 80 is provided on the side of carrier 50 opposite to the planetary gear mechanism 45. The inner members 81 of second clutch 80 are pivoted by respective pins 83 to carrier 50, as shown in FIGS. 1 and 2. The inner members 81 are normally spring-biased radially inwardly by a spring 84. An outer member 82 of change-gear clutch 80 has a ring-like configuration and is integrally coupled to drive plate 35 on the inner side of inner member 41 of starter clutch 40. It will be appreciated that change-gear clutch 80 is assembled within the space inside starter clutch 40, with the first and second clutches 40 and 80 being thus arranged in the radial direction. Change-gear clutch 80 thus faces the planetary gear mechanism 45 together with starter clutch 40 in the axial direction of drive shaft 13, i.e., the planetary gear mechanism 45 and change gear clutch 80 are coaxially arranged and face each other. The inner members 81 of change-gear clutch 80 are each provided with an integral projection 81a projecting in the axial direction of drive shaft 13 for obtaining necessary centrifugal forces. The projections 81a cross the carrier 50 through notches formed thereon at peripheral portions not supporting the planet gears 47 and extend near planetary gear mechanism 45. Further, projections 81a occupy at least part of the space S defined by the three different types of gears of planetary gear mechanism 45, i.e., ring gear 46, planet gears 47 and sun gear 48. Such arrangement effectively further reduces the dimension of the system in the axial direction, in addition to the reduction afforded by the assembly of change-gear clutch 80 in the inner space of starter clutch 40.

The operation of the automatic transmission is described hereinbelow.

The internal combustion engine 10 is started by releasing the spring force stored in spiral spring 31 as described above. Drive plate 35 is thus rotated in unison with the crankshaft, i.e., drive shaft 13, of engine 10. When the engine rpm is increased to a predetermined value from idling, inner members 41 of starter clutch 40, pivoted by pins 43 to drive plate 35, are driven by centrifugal forces to be urged against the outer member 42. With the coupling of starter clutch 40 being effected in such manner, outer member 42 is rotated in unison with drive shaft 13, thus causing rotation of ring gear 46 of planetary gear mechanism 45 mounted on outer member 42, in unison with drive shaft 13.

Figure 3:
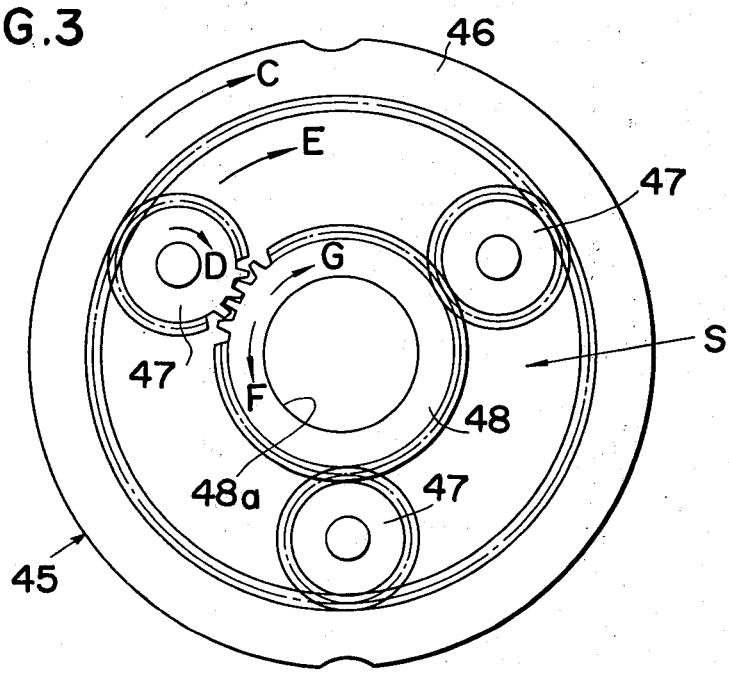
FIG. 3 is a front elevational view taken in the direction of arrow 3 in FIG. 1, showing the planetary gear mechanism.

The direction of rotation of ring gear 46 is indicated by arrow C in FIG. 3. With the rotation of ring gear 46 in the direction of arrow C, planet gears 47 tend to revolve over sun gear 48 in the direction of arrow E while rotating themselves in the direction of arrow D. As a result, sun gear 48 receives a torque in the direction of arrow F opposite to the direction E of revolution of planet gears 47, and thus tends to rotate in the direction F. However, sun gear 48 is coupled through sleeve 60 to one-way clutch 70, and the direction F of the torque exerted to sun gear 48 is the same direction as that of arrow A in FIG. 4 for clutch plate 71 of one-way clutch 70 (FIGS. 3 and 4 are in front and back relation). Thus pawls 74 are brought into meshing engagement with teeth 72a of ratchet plate 72 to prevent the rotation of clutch plate 71, so that sun gear 48 is not rotated in the direction F but is locked in position. Consequently, with the rotation of ring gear 46, planet gears 47 effect revolution over sun gear 48 in the direction E while rotating themselves in the direction D.

With concurrent rotation and revolution of planet gears 47, the power derived from drive shaft 13 is reduced in speed in the power transmission system by means of planetary mechanism 45 because the speed of revolution of planet gears 47 is lower than the speed of rotation of ring gear 46, i.e., the planetary gear mechanism 45 has an effect of changing speed. The revolution of planet gears 47 is transmitted to carrier 50, which rotatably supports planet gears 47 by pins 51, so that revolution of reduced speed is taken out by output shaft 52 through carrier 50. Thus, sprocket wheel 53 mounted on output shaft 52 rotates the driving wheel of the motorcycle via the chain 54, in a low-speed state.

In the above-described operation, a load for rotating the driving wheel acts upon sprocket wheel 53, and acts as a bending force tending to cause flexing of drive shaft 13 because output shaft sleeve 52 is fitted on drive shaft 13. Drive shaft 13 has a cantilever construction with its proximal end on the side of the internal combustion engine 10 supported by bearing 14 as described above. However, in the low speed state, one-way clutch 70 is kept in the coupled state with pawls 74 being meshed with ratchet plate 72, is coupled to case 20 as a stationary member, and is integrally coupled to sun gear 48 and sleeve 60 both fitted on drive shaft 13. Thus, in its state coupled to case 20, one-way clutch 70 serves as a bearing supporting drive shaft 13. Because one-way clutch 70 is disposed at a position on drive shaft 13 on the side of sprocket wheel 53 opposite to bearing 14, drive shaft 13 is supported on both sides of sprocket wheel 53 by one-way clutch 70 and bearing 14, respectively. Thus, shaft 13 can be reliably supported in the low speed state, during which a high bending force acts upon the shaft. Further, the disposition of sprocket wheel 53 at a position near engine 10 is effective for reducing the magnitude of the bending force.

Further, in such low speed state, output sleeve 52 is rotated at a reduced speed compared to drive shaft 13 as described above. Output shaft sleeve 52 is fitted on the outer periphery of drive shaft 13, and sleeve 60 coupling sun gear 48 to one-way clutch 70 is fitted on the outer periphery of output shaft sleeve 52, wherein the sun gear 48 and sleeve 60 are not rotated. Thus, with the provision of sun gear 48 on output shaft sleeve 52, drive shaft 13, output shaft sleeve 52 and sun gear 48 are radially arranged in the order of degree of rotational speed in the mentioned order. Consequently, the difference in the rotational speed between drive shaft 13 and output shaft 52, and between output shaft 52 and sun gear 48, is not substantial, so that it is possible to reduce wear of and frictional resistance offered by the frictional surfaces of members 13, 52 and 48 compared to the case where sun gear 48 is directly fitted on drive shaft 13.

With the increase of the rpm of engine 10, the rotational speed of drive shaft 13 is increased to increase the speed of revolution of planet gears 47. The planet gears 47 are coupled through carrier 50 and pins 83 to the inner members 81 of change-gear clutch 80. Thus, with the increase of the speed of revolution of planet gears 47, the inner members 81 are urged against the outer member 82 by centrifugal forces to effect the coupled state of change-gear clutch 80, with outer member 82 being coupled to drive plate 35 rotating in unison with drive shaft 13. As a result, planet gears 47 are coupled, through drive plate 35, change-gear clutch 80 and carrier 50, to drive shaft 13, i.e., output shaft 52 coupled to carrier 50 is directly coupled to drive shaft 13.

In this case, ring gear 46 of planetary gear mechanism 45 is continuously rotated at the same speed as drive shaft 13 because starter clutch 40 is still in the coupled state. Thus, planet gears 47, having started to rotate in unison with drive shaft 13, are now caused to revolve in the direction of arrow E (FIG. 3) at the same speed as the rotational speed of ring gear 46, which is rotating in the direction of arrow C, and the gears 47 stop their rotation. With the sole revolution of planet gears 47 in the direction E in unison with ring gear 46, sun gear 48 receives torque in the direction of arrow G, opposite to the direction of the low speed state. This direction corresponds to the direction of arrow B in FIG. 4 for clutch plate 71 of one-way clutch 70 coupled to sun gear 48 through the sleeve 60. Thus, engagement between pawls 74 and teeth 72a of ratchet plate 72 is released to permit rotation of sun gear 48 in the direction of arrow G. In this manner, the three different gears 46, 47 and 48 of planetary gear mechanism 45 are rotated in the same direction and at the same speed.

It will be understood from the foregoing that as soon as change-gear clutch 80 is coupled, drive shaft 13 and output shaft sleeve 52 are directly coupled to each other through change-gear clutch 80 to increase the speed from the low speed to a second speed, so that the rpm of the driving wheel of the motorcycle is correspondingly increased.

Although there have been described what are at present considered to be the preferred embodiments of the invention, it will be understood that the invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

We claim:
1. An automatic transmission, comprising:
    a drive shaft (13) driven from a drive source (10);
    a centrifugal first clutch (40);
    a planetary gear mechanism (45);
    an output shaft (52) from which power from said drive shaft (13) is taken out through said planetary gear mechanism (45);
    said drive shaft (13) being provided to project from said drive source, with a proximal end of said drive shaft being supported by a bearing (14) proximal said drive source (10);
    said planetary gear mechanism (45) including an outermost ring gear (46), a central sun gear (48), and planet gears (47) disposed between and meshing with said ring and sun gears;
    said drive shaft (13) being coupled to one of said three different types of gears of said planetary gear mechanism (45) through said centrifugal first clutch (40);

said output shaft (52) being coupled to another one of said three different types of gears;

said planetary gear mechanism (45) being mounted on said drive shaft (13) with said sun gear (48) at the center of said planetary gear mechanism being fitted on said drive shaft (13);

said centrifugal clutch (40) and planetary gear mechanism (45) being disposed on said drive shaft so as to closely face each other; and a one-way clutch (70) coupled on one hand to the remaining one of the three different types of said gates (46, 47, 48) of said planetary gear mechanism (45) coupled to neither said drive shaft (13) nor said output shaft (52), and on the other hand to a stationary member (20).

2. An automatic transmission according to claim 1, wherein:

said drive source comprises an internal combustion engine (10); and said drive shaft comprises a crankshaft (13).

3. An automatic transmission according to claim 1, wherein:

a second clutch (80) is provided between said driven shaft (13) and said planetary gear mechanism (45) coupled to said output shaft (52) such that with the coupling of said second clutch (80), said drive shaft (13) and said output shaft (52) are directly coupled to each other.

4. An automatic transmission according to claim 1, wherein:

said stationary member comprises a case (20) accommodating said one-way clutch (70) and other parts.

5. An automatic transmission comprising:

a drive shaft (13) driven from a drive source (10);

a centrifugal first clutch (40);

a planetary gear mechanism (45);

an output shaft (52) from which power from said drive shaft (13) is taken out through said planetary gear mechanism (45);

said drive shaft (13) being provided to project from said drive source, with a proximal end of said drive shaft being supported by a bearing (14) proximal said drive source (10);

said planetary gear mechanism (45) including an outermost ring gear (46), a central sun gear (48), and planet gears (47) disposed between and meshing with said ring and sun gears;

said drive shaft (13) being coupled to one of said three different types of gears of said planetary gear mechanism (45) through said centrifugal first clutch (40);

said output shaft (52) being coupled to another one of said three different types of gears;

said planetary gear mechanism (45) being mounted on said drive shaft (13) with said sun gear (48) at the center of said planetary gear mechanism being fitted on said drive shaft (13);

said centrifugal clutch (40) and planetary gear mechanism (45) being diposed so as to face each other;

a one-way clutch (70) coupled on one hand to the remaining one of the three different types of said gears (46, 47, 48) of said planetary gear mechanism (45) coupled to neither said drive shaft (13) nor said output shaft (52), and on the other hand to a stationary member (20);

said output shaft (52) comprising a sleeve rotatably fitted on the outer periphery of said drive shaft (13); and a power take-out member (53) connected to said output shaft (52), said one-way clutch (70) being disposed on the side of said power take-out member (53) opposite to said drive source (10).

6. An automatic transmission comprising:

a drive shaft (13) driven from a drive source (10);

a centrifugal first clutch (40);

a planetary gear mechanism (45);

an output shaft (52) from which power from said drive shaft (13) is taken out through said planetary gear mechanism (45);

said drive shaft (13) being provided to project from said drive source, with a proximal end of said drive shaft being supported by a bearing (14) proximal said drive source (10);

said planetary gear mechanism (45) including an outermost ring gear (46), a central sun gear (48), and planet gears (47) disposed between and meshing with said ring and sun gears;

said drive shaft (13) being coupled to one of said three different types of gears of said planetary gear mechanism (45) through said centrifugal first clutch (40);

said output shaft (52) being coupled to another one of said three different types of gears;

said planetary gear mechanism (45) being mounted on said drive shaft (13) with said sun gear (48) at the center of said planetary gear mechanism being fitted on said drive shaft (13);

said centrifugal clutch (40) and planetary gear mechanism (45) being disposed so as to face each other;

a one-way clutch (70) coupled on one hand to the remaining one of the three different types of said gears (46, 47, 48) of said planetary gear mechanism (45) coupled to neither said drive shaft (13) nor said output shaft (52), and on the other hand to a stationary member (20);

said drive shaft (13) being coupled to said ring gear (46) of said planetary gear mechanism (45) through said centrifugal first clutch (40);

said output shaft (52) being coupled to said planet gears (47) of said planetary gear mechanism (45); and said one-way clutch (70) being coupled to said sun gear (48) of said planetary gear mechanism (45).

7. An automatic transmission according to claim 6, wherein:

said output shaft (52) comprises a sleeve rotatably fitted on the other periphery of said drive shaft (13) and wherein said sun gear coupled to said one-way clutch (70) is rotatably fitted on the outer periphery of said output shaft (52).

8. An automatic transmission according to claim 6, wherein:

said centrifugal first clutch (40) coupling said drive shaft (13) to said ring gear (46) of said planetary gear mechanism (45) includes a drum-shaped outer member (42) fitted for rotation around the outer periphery of said drive shaft (13) and accommodating said planetary gear mechanism (45).

9. An automatic transmission according to claim 8, wherein:

said output shaft (52) and said planet gears (47) are coupled together through a carrier (50) rotatably carrying said planet gears (47), and wherein said carrier (50) and said drive shaft (13) are coupled together through a second clutch (80) of a centrifugal type.

10. An automatic transmission according to claim 9, wherein:
said second clutch (80) is assembled within the inner space of said first clutch (40).

11. An automatic transmission according to claim 10, wherein:
said first and second clutches (40, 80) are arranged in a radial plane, with inner members (41) of said first clutch being coupled to said drive shaft (13) through a drive plate (35) secured at right angles thereto, and with a ring-like outer member (82) of said second clutch (80) being coupled to said drive plate (35) on the inner side of said inner members (41) of said first clutch (40).

12. An automatic transmission according to claim 9, wherein:
said second clutch (80) and said planetary gear mechanism (45) are coaxially arranged such that they face each other in the axial direction of said drive shaft (13); and
inner members (81) of said second clutch (80) are provided respectively with integral projections (81a) projecting in the axial direction and occupying at least partially spaces (S) defined by said three different gears (46, 47, 48) of said planetary gear mechanism (45).

13. An automatic transmission according to claim 11, wherein:
said drive shaft (13) comprises a crankshaft of an internal combustion engine, and wherein:
a starter shaft (30) is disposed to face the free end of said crankshaft (13), said drive plate (35) being provided with a pivotable pawl (37) adapted to mesh with ratchet teeth (34) formed on said starter shaft (30) to transmit power, due to rotation of said starter shaft (30), to said crankshaft (13) through said ratchet members (34, 37) and drive plate (35) for starting the internal combustion engine (10).

14. An automatic transmission according to claim 13, wherein:
a spiral spring (31) is coupled at one end thereof to said starter shaft (30) and at the other end thereof to a stationary member (20) so that with rotation of said starter shaft (30), said spring (31) can be wound up to store a spring force for starting the internal combustion engine (10).

* * * * *